(No Model.) 3 Sheets—Sheet 1.

E. PRIDMORE.
CULTIVATOR.

No. 500,349. Patented June 27, 1893.

Witnesses:
Friedrich Gustav Wilhelm
Fred. C. Geyer

Edward Pridmore Inventor
By Wilhelm Bonner
Attorneys.

(No Model.) 3 Sheets—Sheet 2.

E. PRIDMORE.
CULTIVATOR.

No. 500,349. Patented June 27, 1893.

Witnesses:
Friedrich Gustav Wilhelm
Fred. C. Geyer

Edward Pridmore Inventor.
By Wilhelm Bonner
Attorneys.

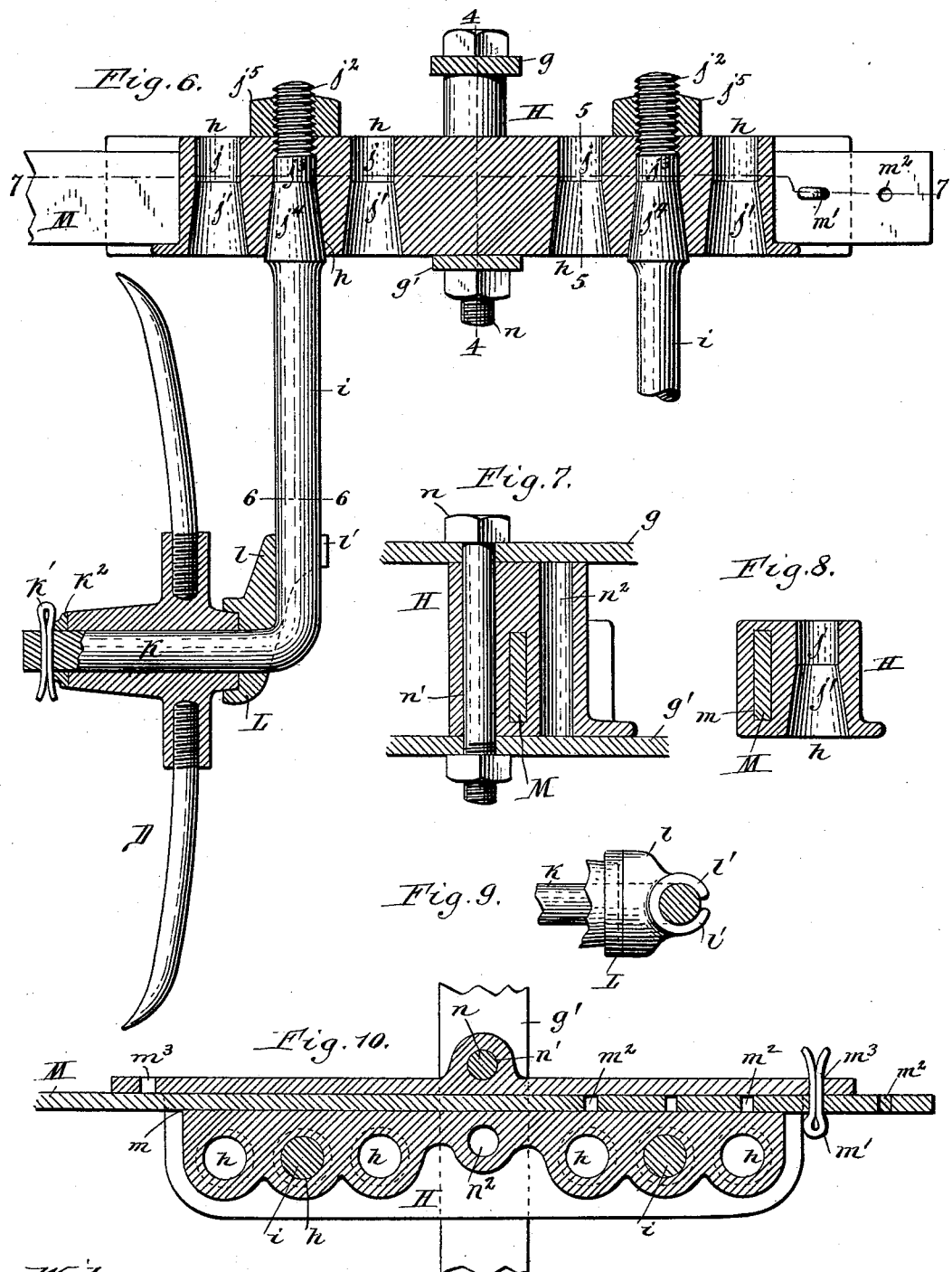

UNITED STATES PATENT OFFICE.

EDWARD PRIDMORE, OF BATAVIA, NEW YORK, ASSIGNOR TO THE JOHNSTON HARVESTER COMPANY, OF SAME PLACE.

CULTIVATOR.

SPECIFICATION forming part of Letters Patent No. 500,349, dated June 27, 1893.

Application filed April 11, 1892. Serial No. 428,611. (No model.)

*To all whom it may concern:*

Be it known that I, EDWARD PRIDMORE, a citizen of the United States, residing at Batavia, in the county of Genesee and State of New York, have invented new and useful Improvements in Cultivators, of which the following is a specification.

This invention relates to cultivators which consist essentially of a wheel frame provided with rearwardly extending movable draft bars to which the cultivating tools are attached and which are principally employed for cultivating beets, potatoes and other small plants.

The objects of my invention are to provide means whereby the cultivating tools can be readily adjusted and securely held in position and to improve the cultivator in several details of construction.

Figure 1:
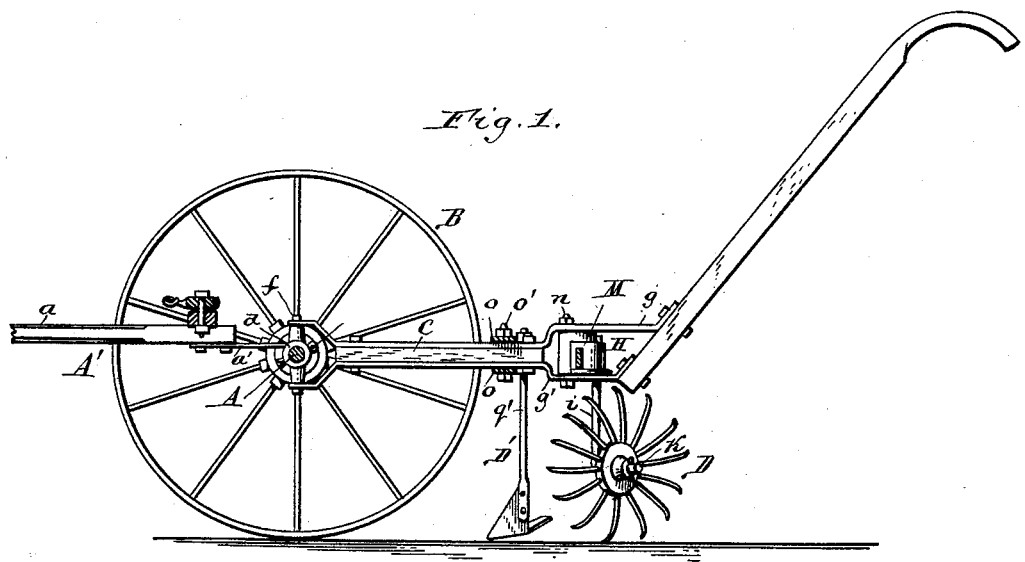
Figure 2:
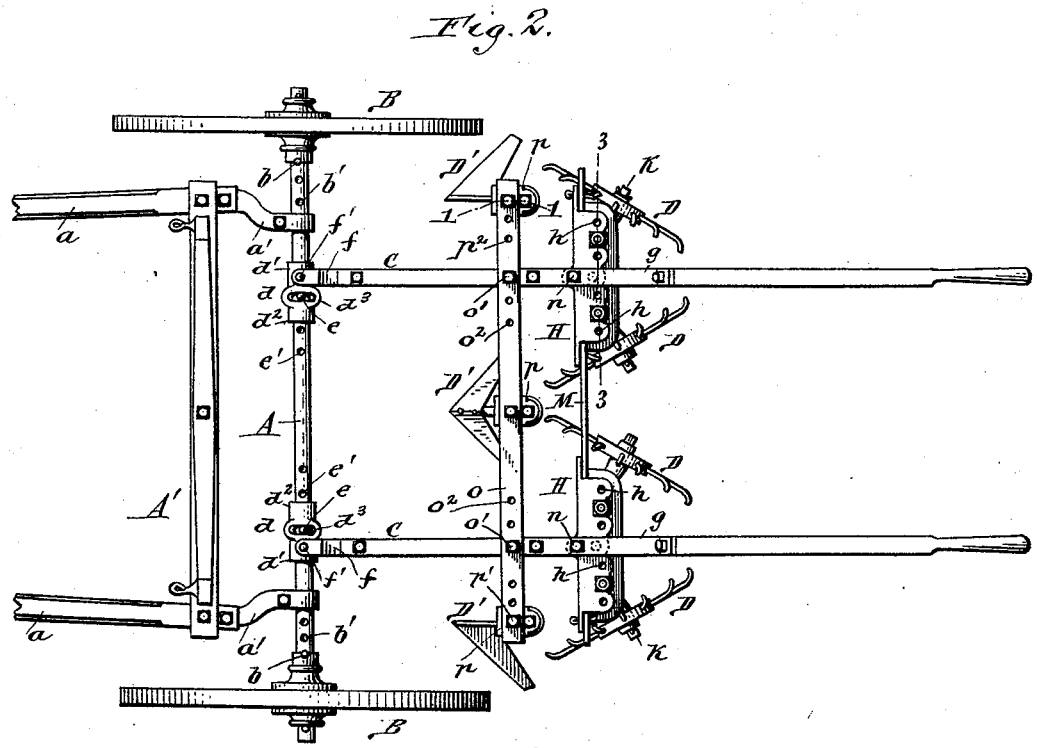
Figure 3:
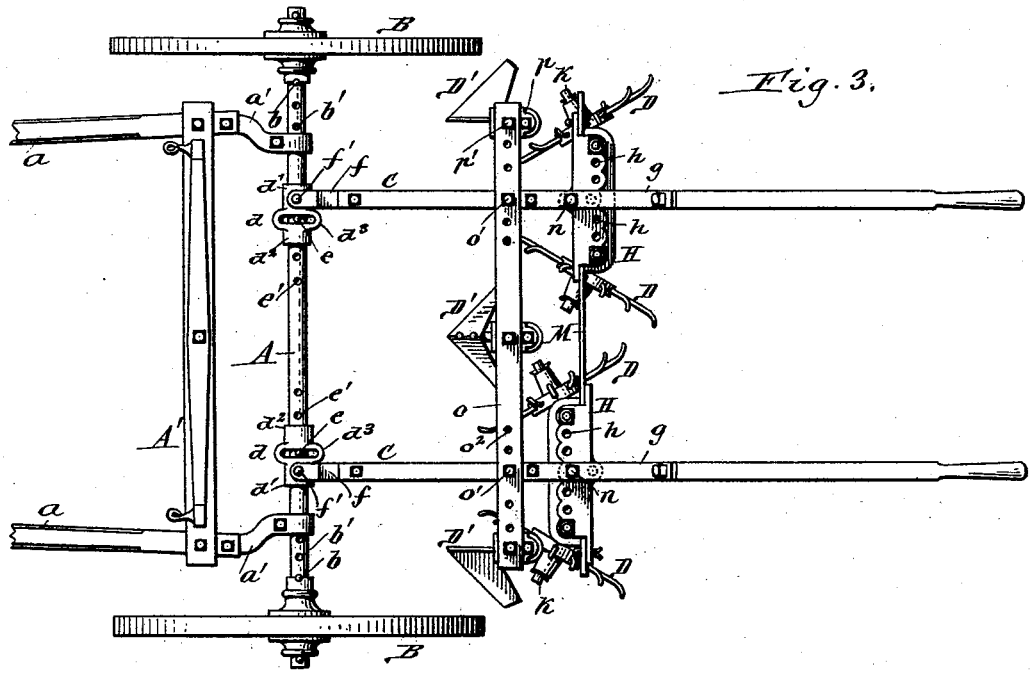
Figure 4:
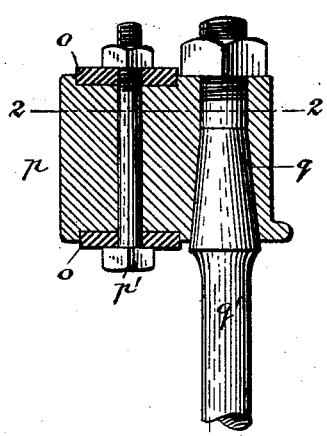
Figure 5:
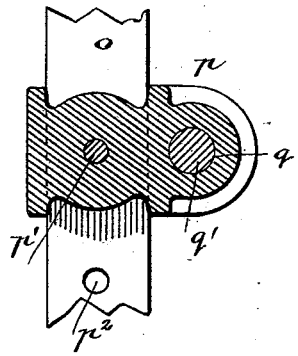

In the accompanying drawings consisting of three sheets:—Figure 1 is a longitudinal sectional elevation of my improved cultivator. Fig. 2 is a plan view thereof, showing the cultivating tools in position for throwing the ground toward the plants. Fig. 3 is a similar view, showing the cultivating tools in position for throwing the ground away from the plants. Fig. 4 is a vertical section, on an enlarged scale, of the socket piece which supports the stem of the front tools, in line 1—1, Fig. 2. Fig. 5 is a horizontal section in line 2—2, Fig. 4. Fig. 6 is a vertical section, on an enlarged scale, of the socket block which supports the rear tools, in line 3—3, Fig. 2. Figs. 7 and 8 are vertical sections in lines 4—
4 and 5—5, Fig. 6, respectively. Figs. 9 and 10 are horizontal sections in lines 6—6 and 7—7, Fig. 6, respectively.

Like letters of reference refer to like parts in the several figures.

A represents the axle of the wheel frame, and A' the draft frame provided with forwardly extending thills $a$ and rearwardly extending bars $a'$ which latter are secured to the axle.

B represents the ground-wheels which are mounted upon the ends of the axle and held against lengthwise movement thereon by spring keys $b$ arranged in openings $b'$ in the axle on opposite sides of the hub of each ground wheel. Several additional openings $b'$ are formed in the ends of the axle into which the spring keys $b$ are shifted when it is desired to move the ground wheels lengthwise on the axle for the purpose of increasing or decreasing the distance between the ground wheels so that the latter will run properly between the rows of plants.

C C represent the longitudinal draft bars which support the rotating and stationary cultivating tools D D', respectively, and connect the same with the axle.

$d$ represents cross heads mounted on the axle and by which the front ends of the draft bars are pivotally attached to the axle. Each of these cross heads consists of two sleeves $d'$ $d^2$ which are separated by an opening and connected by arched bridge pieces $d^3$. Each cross head is free to turn on the axle, but is held against lengthwise movement thereon by a pin $e$ arranged between the collars $d^2$ $d^3$ and engaging in one of a series of transverse openings $e'$ formed in the axle, which openings permit the cross head to be shifted lengthwise on the axle. The front end of each draft bar is bifurcated vertically and its jaws $f$ engage with pins or trunnions $f'$ formed on opposite sides of the collar $d'$ of the cross head, which permits the draft bar to swing horizontally, while it can swing vertically by the turning of the cross head on the axle. The rear end of each draft bar is also bifurcated vertically and its upper and lower jaws $g$ $g'$ carry between them a transverse socket block H to which a pair of the rear cultivating tools D are secured. This socket block is provided with a row of vertical sockets $h$ which receive the upright stems or shanks $i$ carrying the cultivating tools D. This row of sockets is arranged lengthwise in the block and transversely in the machine and the stems of each pair of tools can be shifted from one set of sockets to another to increase or decrease the distance between the tools in accordance with the requirements of the plants. The upper portion $j$ of each socket in the block H is cylindrical and the lower portion $j'$ is conical with its large end arranged downwardly. The upper end of each tool stem is provided with a screw-thread $j^2$, and below the screw-thread with a cylindrical portion $j^3$ and a conical portion $j^4$ corresponding to the cylindrical and conical portions of the sockets $h$ in the block H. The tool stems $i$ are secured in the sockets $h$ by screw-nuts $j^5$ applied to the upper screw-threaded end of the stems and bearing against the upper side of the blocks. When the screw-nuts $j^5$ are loose, the stems can be turned in the sockets to present the cultivating tools at any desired angle to the line of draft, and upon tightening the nuts, the conical portions of the stems bind against the conical portions of the sockets, thereby holding the stems firmly in place. The conical form of the sockets and stems produces an extremely simple and reliable fastening for the tools and permits the same to be quickly adjusted to any angle.

In cultivators designed for cultivating small plants by means of rotating tools, it is of the greatest importance to adjust the tools so as to cultivate closely to the roots of the plants without injuring the same. This is not practicable when the adjusting devices are such that only a certain number of positions can be assumed by the stem, because a comparatively slight change of position at the stem produces a considerable change at the periphery of the rotating tool, where the distance between two adjoining positions is too great for the requirements of thorough work. The conical fastening hereinbefore described permits the stem to assume any desired position, and so permits of an extremely fine adjustment at the periphery of the rotary tool, while it holds the stem as securely against turning as a flat sided fastening. When rotating cultivating tools are employed, the upright stems $i$ are provided at their lower ends with horizontal arbors $k$, preferably formed integrally therewith and upon which the rotating cultivating tools are journaled. These rotating tools may consist of toothed spiders, as represented in the drawings, or the usual concavo-convex disks, if desired.

$k'$ represents a spring-key arranged in the outer end of the arbor, whereby the spider is secured in place, and $k^2$ is a washer arranged between the spring key and the hub of the spider.

L represents a washer arranged upon the inner end of the arbor and interposed between the hub of the rotating tool and the upright stem. The washer L is provided with an upward extension $l$ terminating in two lips or ears $l'$ $l'$ which straddle the stem and thereby prevent the washer from turning on the arbor. The washer is preferably secured to the stem by closing the lips $l'$ upon the stem by a cold shut, as represented in Figs. 8 and 9.

M represents a transverse bar which connects the socket blocks of both draft bars and holds both pairs of rotating cultivating tools a certain distance apart. This bar is arranged with its ends in openings $m$ formed lengthwise in the blocks H or transversely in the machine on one side of the sockets $h$ and is secured thereto by spring keys $m'$ passing through openings $m^2$ in the connecting bar and perforated lugs $m^3$ formed on the socket blocks. The connecting bar is provided with an additional number of openings $m^2$ arranged lengthwise to permit the distance between the two pairs of tools to be regulated by shifting the spring key $m'$ from one opening $m^2$ to another. Each of the socket blocks is pivotally attached midway of its length to the rear jaws of one of the draft bars by a vertical pivot bolt $n$. The block is provided with two openings $n'$ $n^2$ arranged respectively in front and rear of the connecting bar and into either of which the pivot bolt $n$ may be inserted, thereby permitting the socket block to be shifted lengthwise of the machine. When it is desired to throw the ground toward the plants the rotating tools of each pair diverge forwardly and have their concave sides facing each other, as represented in Figs. 1 and 2. In this arrangement, the socket blocks are secured to the draft bars by passing the pivot bolt through the front opening $n'$ of the blocks, which causes the sockets in the latter to be arranged in rear of the connecting bar, thereby placing both pairs of cultivating tools transversely in line. When it is desired to throw the ground away from the plants, the cultivating tools are reversed, so that the tools of each pair converge forwardly and have their concave sides facing outwardly. This causes the inner tools of both pairs to throw the ground against each other which is liable to clog the same and render them less effective, particularly when the soil is wet. In order to obviate this, one of the socket blocks is reversed on the connecting bar and the pivot bolt $n$ is shifted from the front opening $n'$ to the rear opening $n^2$. The sockets of the reversed block are thereby shifted in front of the connecting bar which causes one pair of cultivating tools to be arranged a short distance in advance of the other pair of tools, as represented in Fig. 3, thereby reducing the interference between the inner tools of both pairs when the ground is thrown away from the plants. By forming the two openings $n'$ $n^2$ in the socket block on opposite sides of the connecting bar to receive the pivot bolt $n$, either block can be reversed without disturbing the parallel position of said bar with reference to the axle.

$o$ $o$ represent transverse carrying bars which connect the draft bars in front of the socket blocks and support stationary cultivating tools D' D', such as hoes or cutters, which travel in advance of the cultivator spiders or disks and prepare the ground for the latter. These bars are secured to the upper and lower sides of the draft bars by pivot bolts $o'$ and are provided at their middle and at their ends with socket pieces $p$ which carry the hoes or cutters. The socket pieces are secured between the carrying bars by bolts $p'$ and each socket piece is provided in that portion which projects rearwardly beyond the transverse bars with a socket $q$ which receives the upright stem or shank $q'$ of one of the hoes or cutters. The shape of the sockets $q$ and the stems $q'$ of the stationary tools arranged therein is similar to that of the sockets in the block H and the stems of the rotating cultivator tools. The end portions of the carrying bars are provided with a number of openings $p^2$ to permit the bolt $p'$ and the outer hoes or cutters to be shifted transversely. The carrying bars are also provided with additional openings $o^2$ in which the bolts $o'$ may be placed when it is desired to bring the draft bars nearer together. By turning the socket pieces so that they project either to the front or rear from the transverse bars the tools can be adjusted lengthwise in the machine. The carrying bars also serve, in addition to the connecting bar, to hold the cultivating tools parallel with the axle, although the draft bars may stand at an angle to the line of draft.

R represents the handles which are secured with their lower ends to the rear jaws of the draft bars and by which the operator controls the course of the cultivating tools.

If desired, hoes or cutters or tools of any other kind may be substituted for the rotating tools attached to the blocks H, as may be best suited to the crop.

I claim as my invention—

1. The combination with the draft frame and the draft bars, of socket blocks supporting the cultivating tools, each of said blocks being provided with a transverse opening and vertical pivot sockets on the front and rear sides of said transverse opening, pivot bolts connecting said blocks with the rear ends of the draft bars and passing through one of the pivot sockets in each of the blocks, and a connecting bar arranged with its ends in the transverse openings of both blocks, substantially as set forth.

2. The combination with the wheeled frame and the draft bars, of transverse bars connecting the draft bars, socket pieces secured to said bars, and cultivating tools having their stems secured in said socket pieces, and socket blocks secured to the draft bars in rear of said transverse bars, and cultivating tools having their stems secured in said socket blocks, substantially as set forth.

3. The combination with the draft frame and the longitudinal draft bars, of transverse bars secured to the upper and lower sides of the draft bars, socket pieces secured between the transverse bars and provided with sockets in their projecting portions outside of said bars, and cultivating tools, having their stems secured in said sockets without passing through the transverse bars, substantially as set forth.

4. The combination with the draft frame and a draft bar, of an upright stem secured to the draft bar and provided with a horizontal arbor, a rotating cultivating tool journaled on said arbor, and a washer arranged on the arbor between the tool and the stem and provided with lips or ears which straddle the upright stem, substantially as set forth.

Witness my hand this 7th day of April, 1892.

EDWARD PRIDMORE.

Witnesses:
GEORGE O. VALZ,
E. K. CALKINS.